(12) United States Patent
Suzuki et al.

(10) Patent No.: US 12,083,870 B2
(45) Date of Patent: Sep. 10, 2024

(54) CARRIER PLATE AND OBJECT MOVEMENT DEVICE

(71) Applicant: HI-LEX CORPORATION, Takarazuka (JP)

(72) Inventors: Kazuaki Suzuki, Tochigi (JP); Katsuhiko Fuki, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 18/030,509

(22) PCT Filed: Oct. 28, 2021

(86) PCT No.: PCT/JP2021/039727
§ 371 (c)(1),
(2) Date: Apr. 6, 2023

(87) PCT Pub. No.: WO2022/092174
PCT Pub. Date: May 5, 2022

(65) Prior Publication Data
US 2023/0364973 A1    Nov. 16, 2023

(30) Foreign Application Priority Data
Oct. 28, 2020    (JP) .............................. 2020-180357

(51) Int. Cl.
*E05F 11/54*    (2006.01)
*B60J 1/17*    (2006.01)
(Continued)

(52) U.S. Cl.
CPC ............... *B60J 1/17* (2013.01); *E05F 11/483* (2013.01); *E05F 15/697* (2015.01)

(58) Field of Classification Search
CPC .......... B60J 1/17; E05F 11/483; E05F 11/488; E05F 11/485; E05F 15/697; E05F 15/689;
(Continued)

(56) References Cited

U.S. PATENT DOCUMENTS

| 4,313,282 A | * | 2/1982 | Hagemann | ............ E05F 11/485 49/352 |
| 4,657,523 A | * | 4/1987 | Chevance | ............ E05F 11/485 49/352 |

(Continued)

FOREIGN PATENT DOCUMENTS

| EP | 1491780 A2 * | 12/2004 | ............ E05F 11/485 |
| JP | 2009-167637 | 7/2009 | |

OTHER PUBLICATIONS

International Search Report and Written Opinion for International Application No. PCT/JP2021/039727 mailed on Dec. 14, 2021, 8 pages.

*Primary Examiner* — Jerry E Redman
(74) *Attorney, Agent, or Firm* — Amin, Turocy & Watson, LLP (57) ABSTRACT

A carrier plate to which a moving object is attached and that includes a holding portion holding an end portion of a driving-force transmission member transmitting a driving force for moving the moving object is configured to include: a first surface facing a guide rail on which the carrier plate slides; a second surface placed on an opposite side of the first surface; and a side surface placed between the first surface and the second surface, the side surface including an opening portion into which the driving-force transmission member is inserted. Such a configuration can enhance the efficiency of the assembly work while suppressing an increase in size.

4 Claims, 11 Drawing Sheets

(51) Int. Cl.
  *E05F 11/48* (2006.01)
  *E05F 15/697* (2015.01)

(58) Field of Classification Search
  CPC .......... E05Y 2201/47; E05Y 2201/474; E05Y 2201/654; E05Y 2201/672; E05Y 2800/682; E05Y 2900/55
  USPC ........................................................ 49/352
  See application file for complete search history.

(56) References Cited

U.S. PATENT DOCUMENTS

| | | | | |
|---|---|---|---|---|
| 6,202,351 B1 * | 3/2001 | Medebach | ............ | E05F 11/485 49/352 |
| 7,325,360 B2 * | 2/2008 | Mazouzi | ............... | E05F 11/485 254/231 |
| 7,472,515 B2 * | 1/2009 | Mazouzi | ............... | E05F 11/485 49/352 |
| 8,943,750 B2 * | 2/2015 | Twork, Jr. | ............ | E05F 11/385 49/352 |
| 10,287,811 B1 * | 5/2019 | Arimoto | ............... | E05F 11/485 |
| 10,604,981 B2 * | 3/2020 | Shiroma | ............... | E05F 11/486 |
| 11,674,348 B2 * | 6/2023 | Krieger | ..................... | F16C 1/08 49/352 |
| 11,788,336 B2 * | 10/2023 | Kashiwagi | ............ | E05F 15/689 49/352 |
| 2005/0194580 A1 * | 9/2005 | Mazouzi | ............... | E05F 11/485 254/231 |
| 2007/0294947 A1 * | 12/2007 | Fassbender | ........... | E05F 11/382 49/227 |
| 2008/0236049 A1 * | 10/2008 | Arimoto | ............... | E05F 11/483 49/352 |
| 2013/0227889 A1 * | 9/2013 | Matsushita | ........... | E05F 11/483 49/352 |
| 2023/0364973 A1 * | 11/2023 | Suzuki | ................. | E05F 11/485 |

* cited by examiner

CARRIER PLATE AND OBJECT MOVEMENT DEVICE

TECHNICAL FIELD

The present invention relates to a carrier plate and an object movement device.

BACKGROUND ART

In a conventional and general carrier plate, a housing portion for housing a cable end may be formed on the surface of a carrier plate on the side of a guide rail. However, when such a carrier plate is attached to the guide rail, the following procedure is required, in which the cable end is first placed on the surface of the carrier plate on the guide rail side, and then the carrier plate is attached to the guide rail while preventing the cable end from coming off the carrier plate. Thus, there arises a problem in that work efficiency of assembling a window regulator is poor.

As a countermeasure against this, in a carrier plate disclosed in Patent Literature (hereinafter, referred to as PTL) 1, a housing portion for housing a cable end is formed on the second surface, which is the opposite side of the first surface on the guide rail side of the carrier plate. This configuration makes it possible to attach the carrier plate to the guide rail and then attach the cable end to the carrier plate when the window regulator is assembled. According to the carrier plate disclosed in PTL 1, the attaching operation of the cable end is easier than the attaching operation when the housing portion is formed on the first surface of the carrier plate, thus improving the efficiency of the assembling work of the window regulator.

CITATION LIST

Patent Literature

PTL 1
 Japanese Patent Application Laid-Open No. 2009-167637

SUMMARY OF INVENTION

Technical Problem

However, in the carrier plate disclosed in PTL 1, providing a space region that forms a housing portion on the second surface may decrease the stiffness for holding the window glass in the carrier plate. To solve this problem, it is conceivable to provide a reinforcing member to the second surface of the carrier plate or to increase the thickness of the carrier plate, but these solutions lead to an increase in the size of the carrier plate, and thus suppressing the increase in the size of the carrier plate is desired.

An object of the present invention is to provide a carrier plate and an object movement device each capable of enhancing the efficiency of the assembly operation while suppressing an increase in size.

Solution to Problem

A carrier plate according to the present invention is a carrier plate to which a moving object is attached and that includes a holding portion holding an end portion of a driving-force transmission member transmitting a driving force for moving the moving object, and the carrier plate includes: a first surface facing a guide rail on which the carrier plate slides; a second surface placed on an opposite side of the first surface; and a side surface placed between the first surface and the second surface, the side surface including an opening portion into which the driving-force transmission member is inserted.

Advantageous Effects of Invention

According to the present invention, it is possible to obtain a carrier plate and an object movement device that can enhance the efficiency of the assembly operation while suppressing an increase in size.

DESCRIPTION OF EMBODIMENTS

Figure 1:
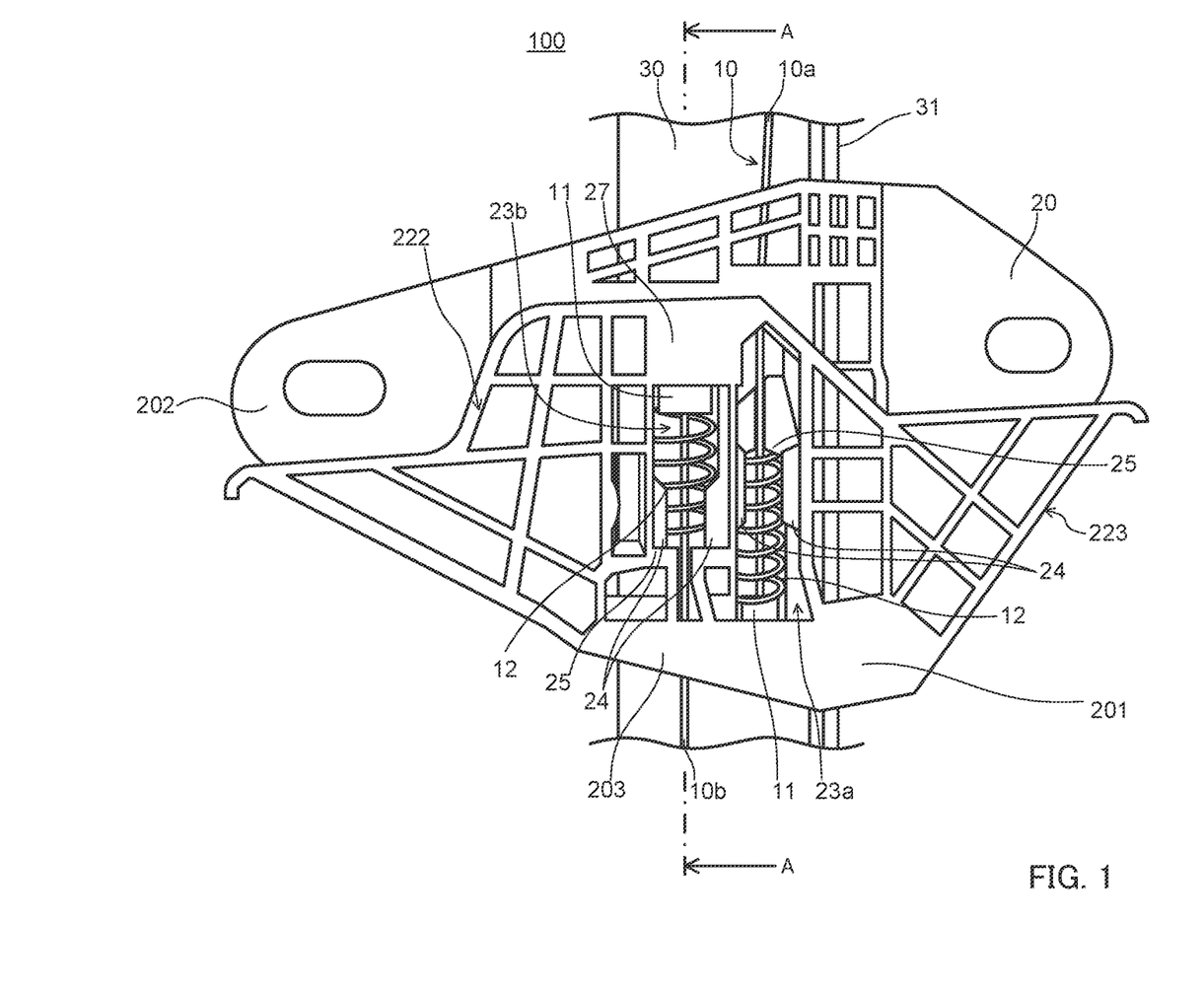
FIG. 1 illustrates an exemplary configuration of object movement device 100 according to an embodiment of the present invention.
Figure 2:
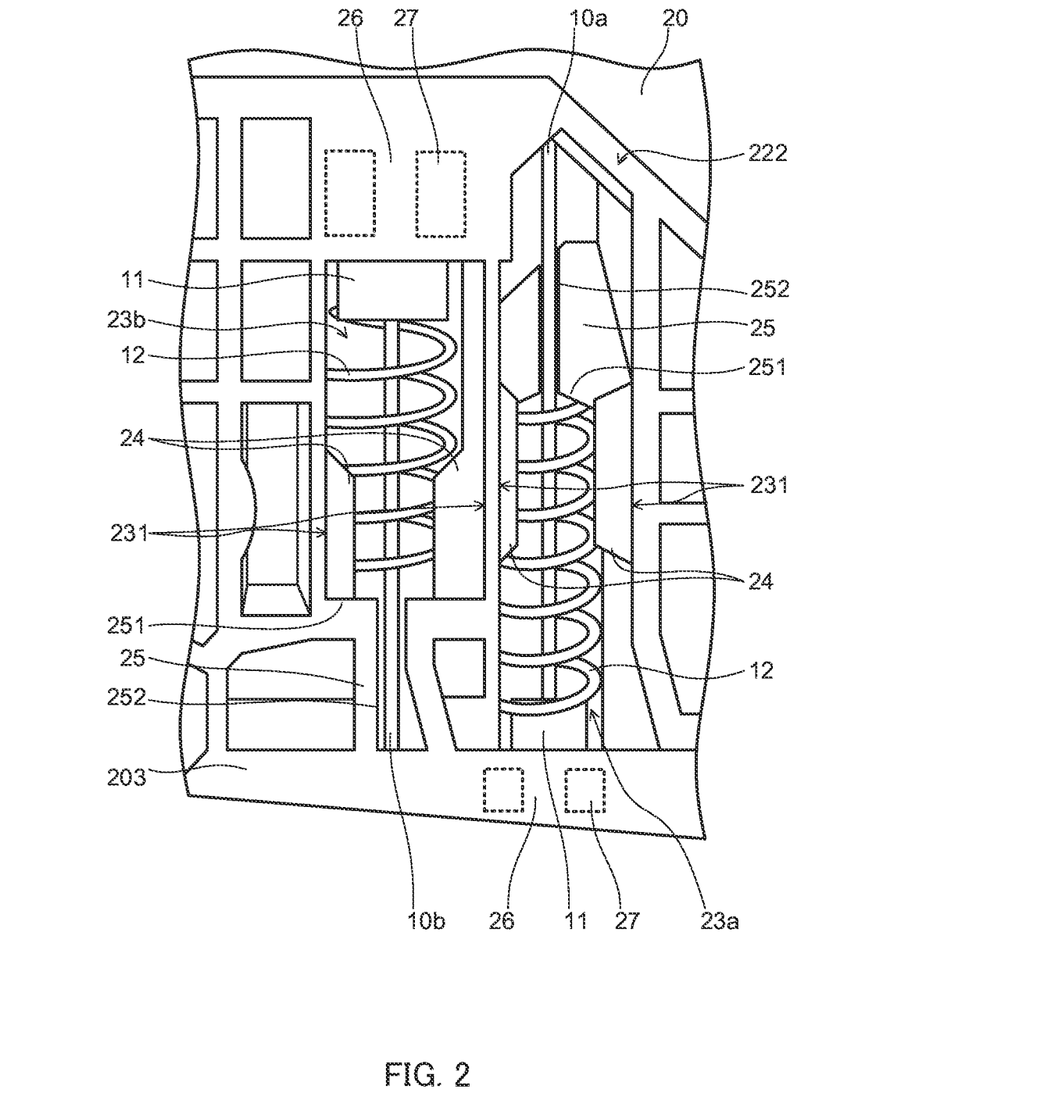
FIG. 2 is an enlarged view of a portion of carrier plate 20 illustrated in FIG. 1.
Figure 3:
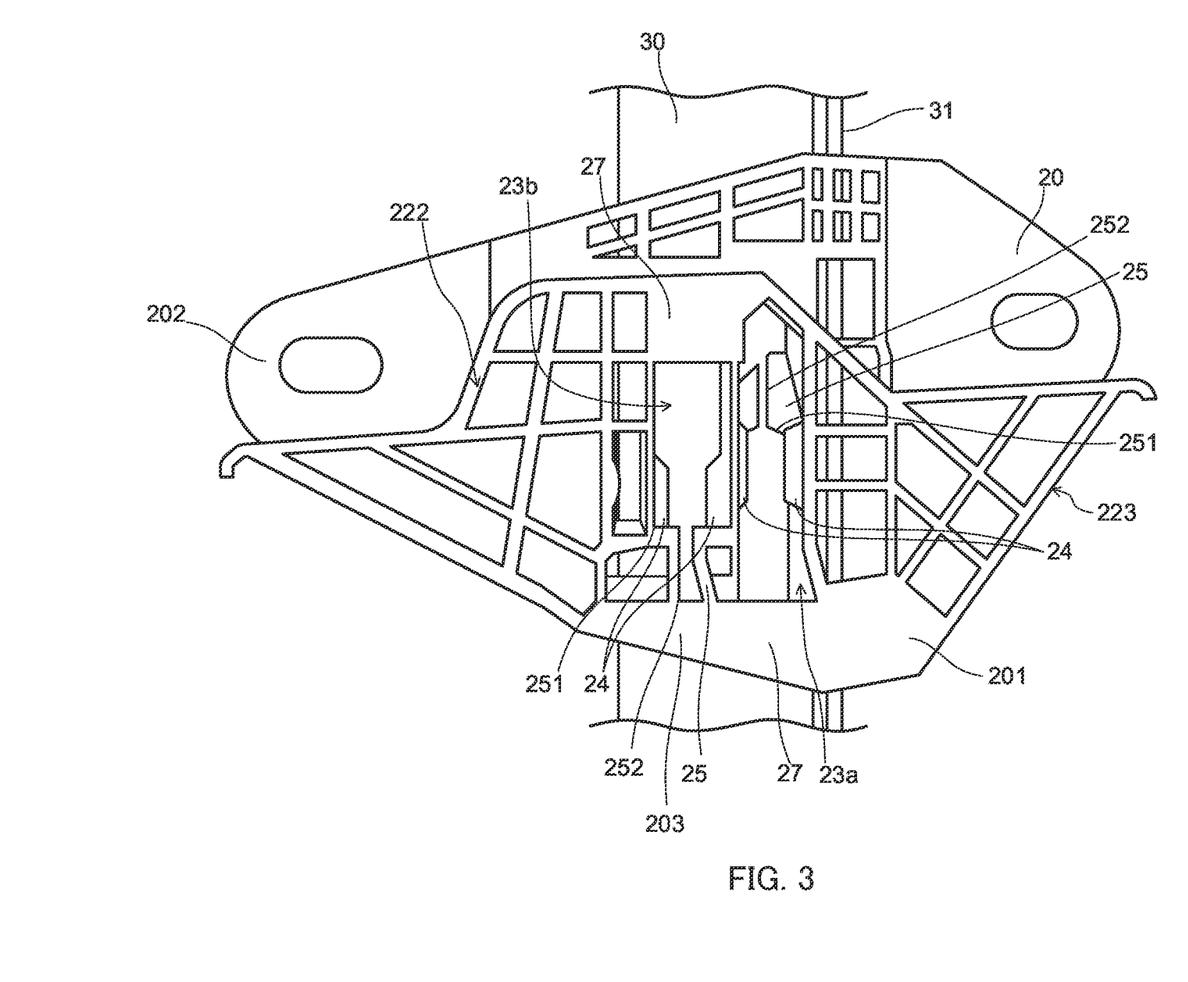
FIG. 3 is a front view of carrier plate 20.
Figure 4:
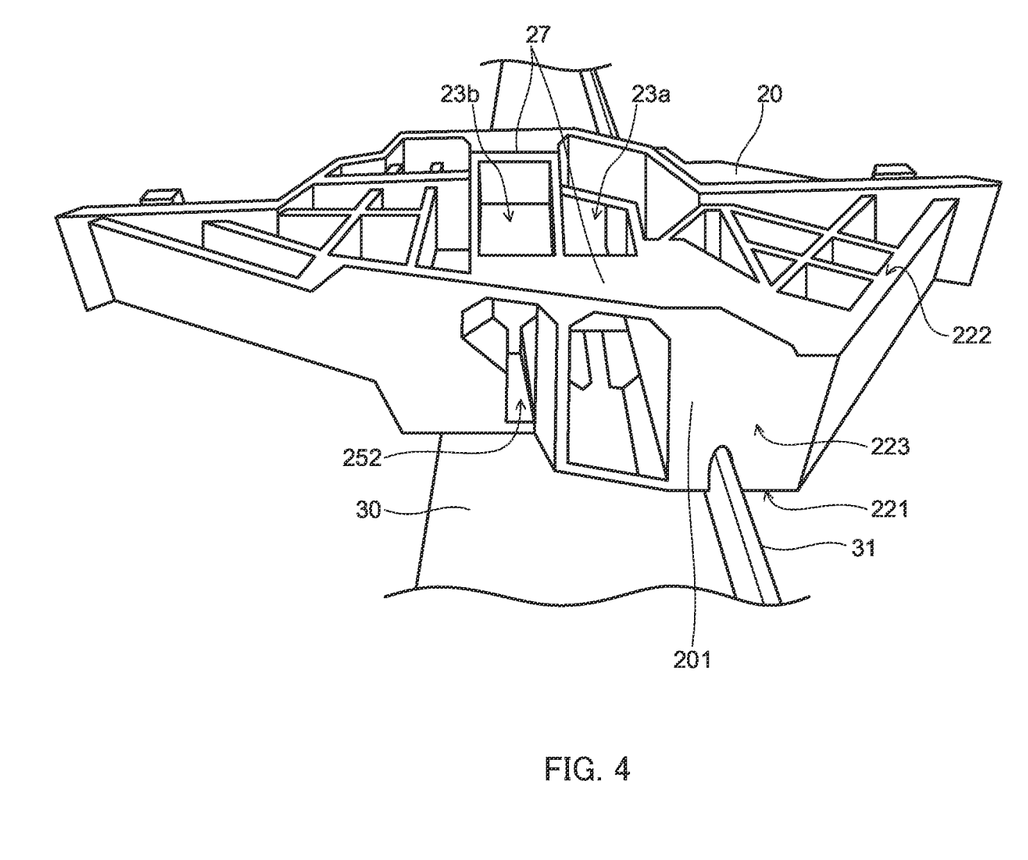
FIG. 4 is a perspective view of carrier plate 20.

Hereinafter, an embodiment of the present invention will be described in detail with reference to the drawings. FIG. 1 illustrates an exemplary configuration of object movement device 100 according to the embodiment of the present invention. FIG. 1 illustrates carrier plate 20 with the end portion of a cable being inserted. FIG. 2 is an enlarged view of a portion of carrier plate 20 illustrated in FIG. 1, FIG. 3 is a front view of carrier plate 20, and FIG. 4 is a perspective view of carrier plate 20.

For example, object movement device 100 illustrated in FIG. 1 is attached to an inner panel of a door of a vehicle, and is applied to a window regulator or the like that moves carrier plate 20 to move a window glass attached to carrier plate 20. In the present embodiment, the moving object is a window glass attached to carrier plate 20. When the exemplary application is a window regulator, the moving direction of carrier plate 20 is an up and down direction defined based on the raising and lowering direction of the window glass, which is the moving object.

Object movement device 100 includes cable 10 that is a driving-force transmission member transmitting the driving force for moving the moving object, carrier plate 20, and guide rail 30 on which carrier plate 20 slides.

(Configuration of Cable 10)

Cable 10 is a pulling member that pulls carrier plate 20 by transmitting the driving force generated by a not-illustrated driving portion to carrier plate 20, and is, for example, a flexible cable made of metal wires, plastic fibers, and/or the like twisted together. Cable 10 is configured with two cables 10a and 10b.

One end of cable 10a is connected to carrier plate 20. For example, cable 10a extends from carrier plate 20 toward, for example, a not-illustrated pulley portion attached to the upper end portion of guide rail 30, and further extends to the driving portion through the pulley portion. Then, the other end of cable 10a is connected to the driving portion.

One end of cable 10b is also connected to carrier plate 20. Cable 10b extends from carrier plate 20 toward, for example, a not-illustrated pulley portion or the like attached to the lower end portion of guide rail 30, and further extends to the driving portion through the pulley portion. Then, the other end of cable 10b is connected to the driving portion.

Note that the driving portion is a device that winds and unwinds cable 10 to move carrier plate 20. The driving portion includes, for example, a drum on which cable 10 is wound, a motor, and a power transmission portion, such as a worm gear, that transmits the rotation of the motor to the drum. The driving portion is an exemplary draw-in portion that is provided at an end portion of guide rail 30, for example, and houses a drum drawing cable 10.

When the motor rotates in the forward direction, the rotational motion of the motor is transmitted to the drum through the power transmission portion, and the drum rotates in the forward direction. In this case, cable 10a is wound around the drum and cable 10b is unwound from the drum. This raises carrier plate 20.

On the other hand, when the motor rotates in the opposite direction, the drum rotates in the opposite direction, so that cable 10b is wound around the drum and cable 10a is unwound from the drum. This lowers carrier plate 20.

(Configuration of Guide Rail 30)

Guide rail 30 is a member that extends in the moving direction of the window glass and guides the up and down movement of carrier plate 20. Guiding portion 31 for supporting carrier plate 20 to be movable is formed in guide rail 30.

(Configuration of Carrier Plate 20)

Carrier plate 20 is a member that moves the window glass up and down on guide rail 30 while holding the window glass.

Carrier plate 20 includes first surface 221 facing guide rail 30, second surface 222 placed on the opposite side of first surface 221, and side surface 223 provided between first surface 221 and second surface 222. Further, carrier plate 20 includes a portion to be guided (hereinafter, referred to as "guided portion") 201 that moves up and down on guide rail 30, attachment portion 202 to which the window glass is attached, and housing portion 203 that houses cable 10.

(Configuration of Guided Portion 201)

Guided portion 201 is locked to guiding portion 31 formed in guide rail 30, and is movably attached to guide rail 30. Guided portion 201 is integrally formed with attachment portion 202 and housing portion 203.

(Configuration of Housing Portion 203)

As illustrated in FIG. 2, housing portion 203 includes opening portion 23a, opening portion 23b, protrusion portions 24, holding portions 25, inclined portions 26, and rib portions 27. Hereinafter, when opening portion 23a and opening portion 23b are not distinguished from each other, they are simply referred to as "opening portion 23". Note that inclined portions 26 are each provided between two square regions indicated by dotted lines in FIG. 2.

(Configuration of Opening Portion 23)

Opening portion 23a opens to the upper side of side surface 223 of carrier plate 20 so that the end portion of cable 10a can be inserted. Opening portion 23b opens to the lower side of side surface 223 of carrier plate 20 so that the end portion of cable 10b can be inserted.

In opening portion 23, protrusion portions 24, holding portion 25, inclined portion 26, and rib portions 27 are provided.

(Configuration of Protrusion Portions 24)

Protrusion portions 24 guide the end portion of cable 10 inserted into opening portion 23 toward inclined portion 26 placed at the back side of opening portion 23 in the first region in opening portion 23, and restricts the end portion of cable 10 placed in the second region in opening portion 23 from coming off to the outside of carrier plate 20. The first region and the second region will be described in detail later.

Protrusion portions 24 are provided on wall surfaces 231 that form opening portion 23. In the embodiment of the present invention, two protrusion portions 24 placed so as to be apart from each other with a predetermined distance are formed in opening portion 23.

(Configuration of Holding Portions 25)

Holding portions 25 are each a member for holding the end portion of cable 10 in the second region in opening portion 23 of housing portion 203. Holding portion 25 is provided on wall surfaces 231 that form opening portion 23.

Holding portion 25 includes contact surface 251 with which spring 12 provided to the end portion of cable 10 is in contact, and pullout opening 252 for pulling cable 10 out to the outside of carrier plate 20 while spring 12 is in contact with contact surface 251.

Spring 12 is a member that pulls cable 10 to compensate for extension of cable 10 when cable 10 is extended due to aging.

(Configuration of Inclined Portions 26)

Inclined portions 26 are each a member for guiding the end portion of cable 10 inserted into the first region formed in opening portion 23 from the first region to the second region. Inclined portion 26 will be described in detail later.

Next, a process of inserting the end portion of cable 10 into carrier plate 20 will be described with reference to FIGS. 5 to 11.

FIG. 5 to FIG. 11 are diagrams for describing a process of inserting cable 10b into opening portion 23b of carrier plate 20.

Figure 5:
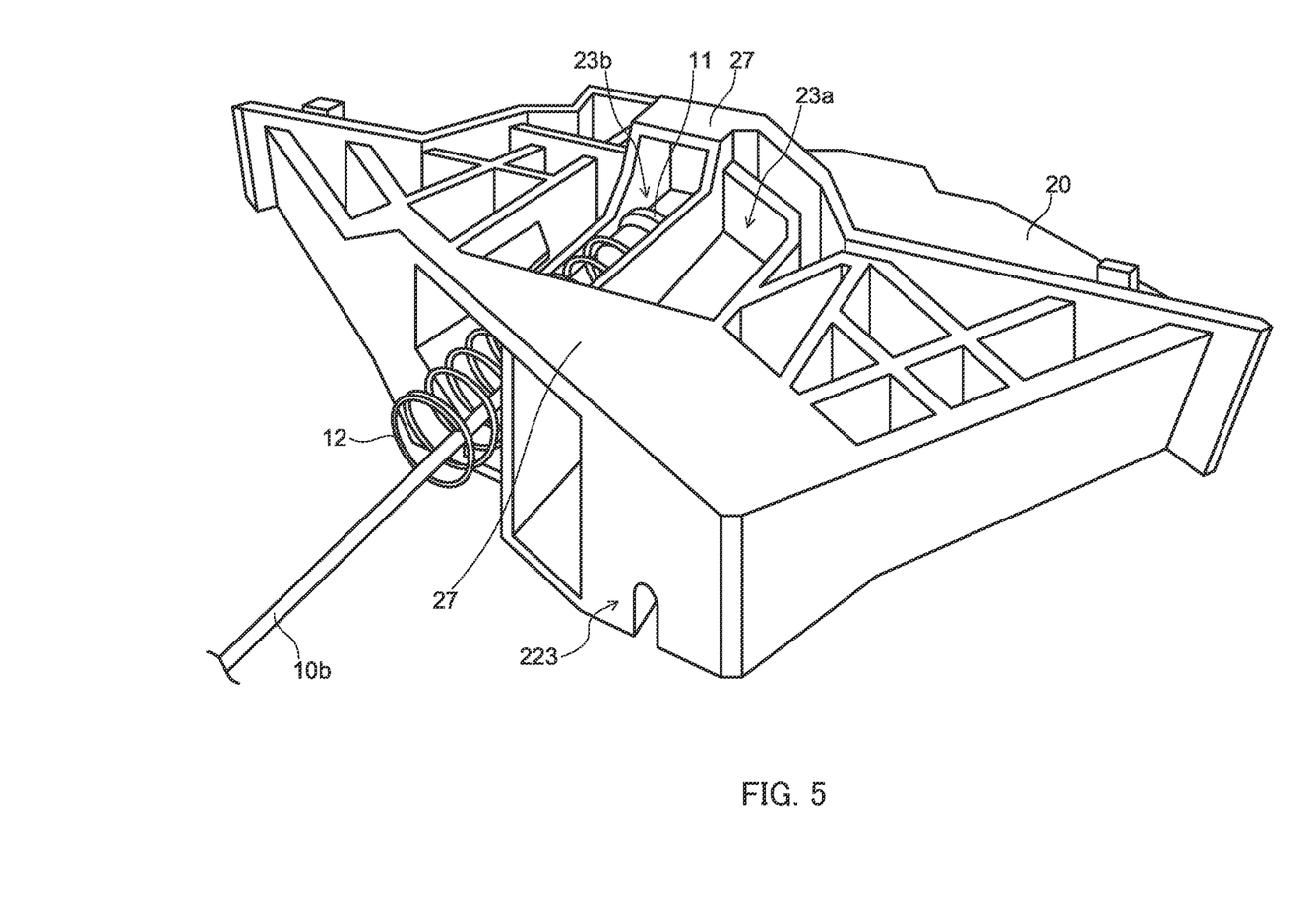
FIG. 5 is a diagram for describing a process of inserting cable 10b into opening portion 23b of carrier plate 20.

FIG. 5 illustrates a state in which the end portion of cable 10b is inserted into first region formed in opening portion 23b of carrier plate 20.

Figure 6:
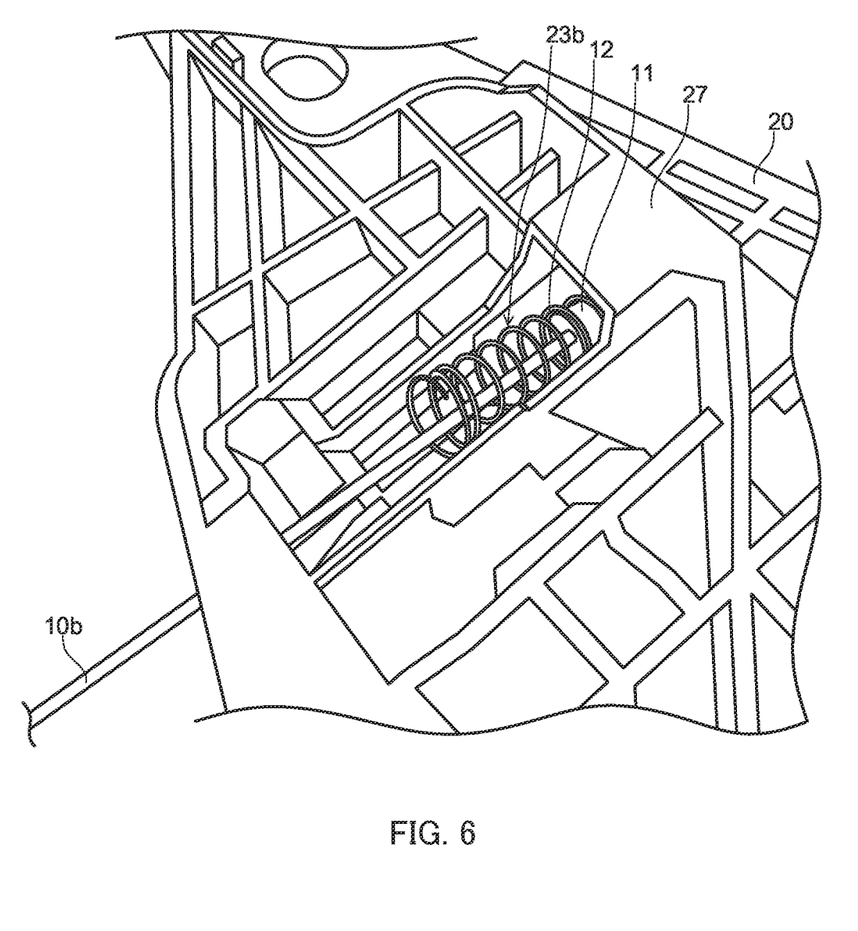
FIG. 6 is another diagram for describing the process of inserting cable 10b into opening portion 23b of carrier plate 20.

FIG. 6 illustrates a state in which the end portion of cable 10b inserted into the first region is further pushed in. When the end portion of cable 10 is thus pushed in, cable end 11 comes into contact with inclined portion 26 illustrated in drawings such as FIG. 7.

Figure 7:
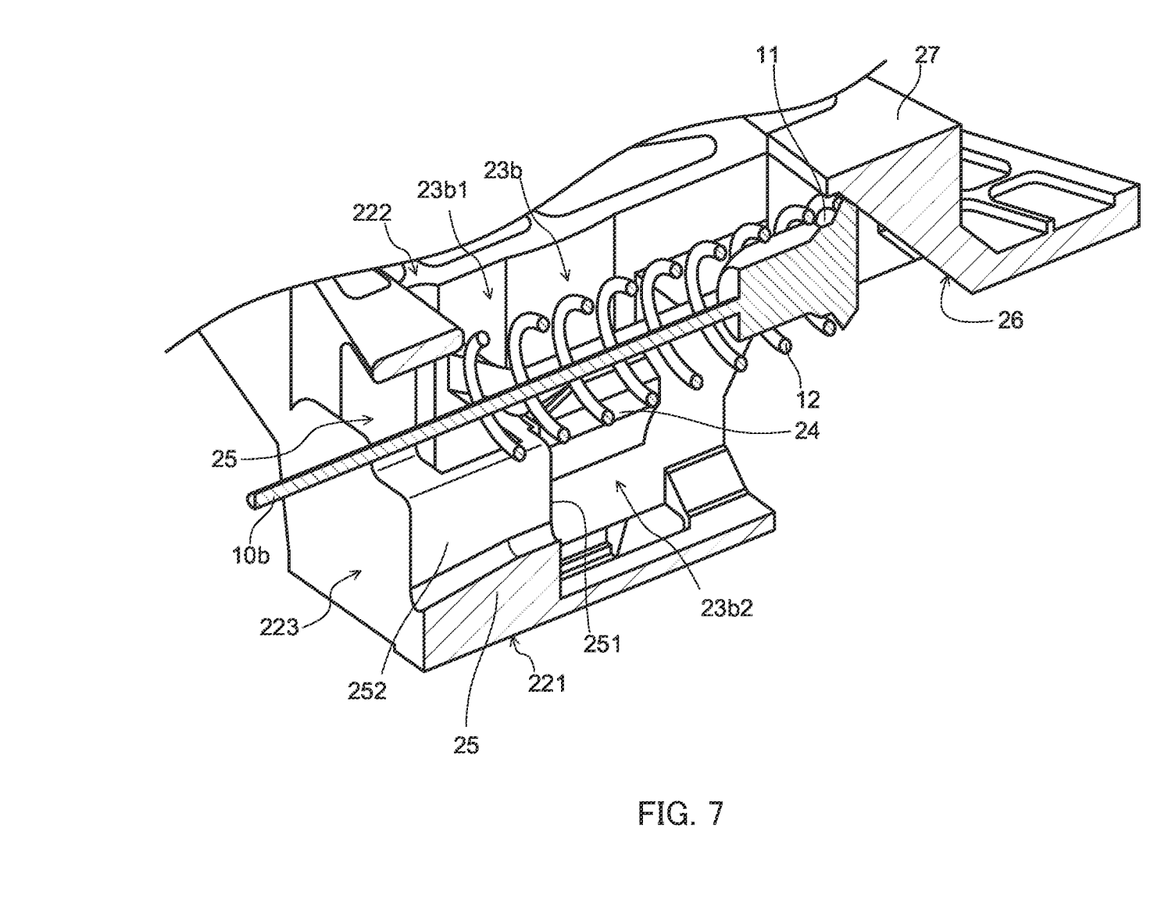
FIG. 7 is still another diagram for describing the process of inserting cable 10b into opening portion 23b of carrier plate 20.
Figure 8:
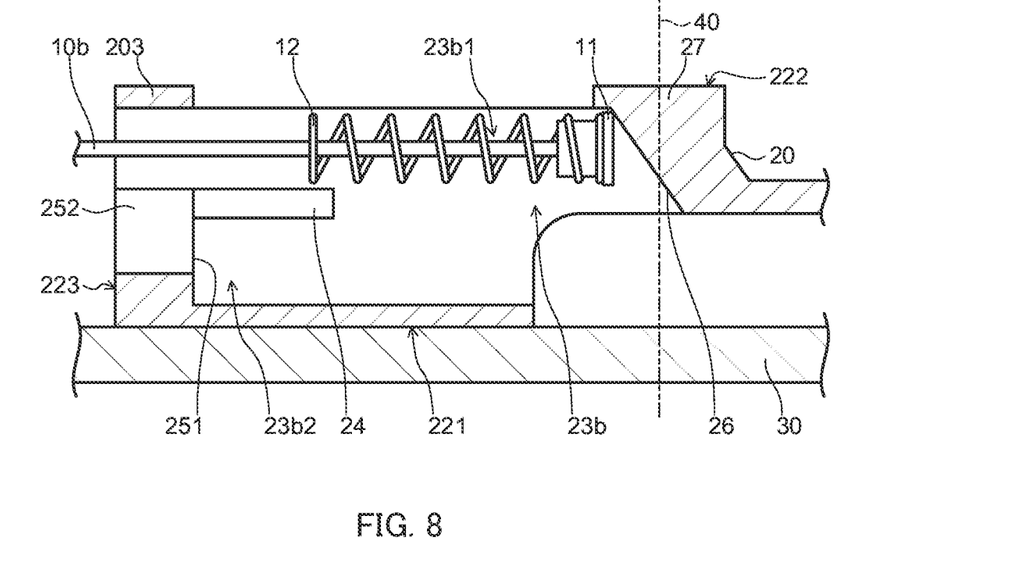
FIG. 8 is still another diagram for describing the process of inserting cable 10b into opening portion 23b of carrier plate 20.
Figure 9:
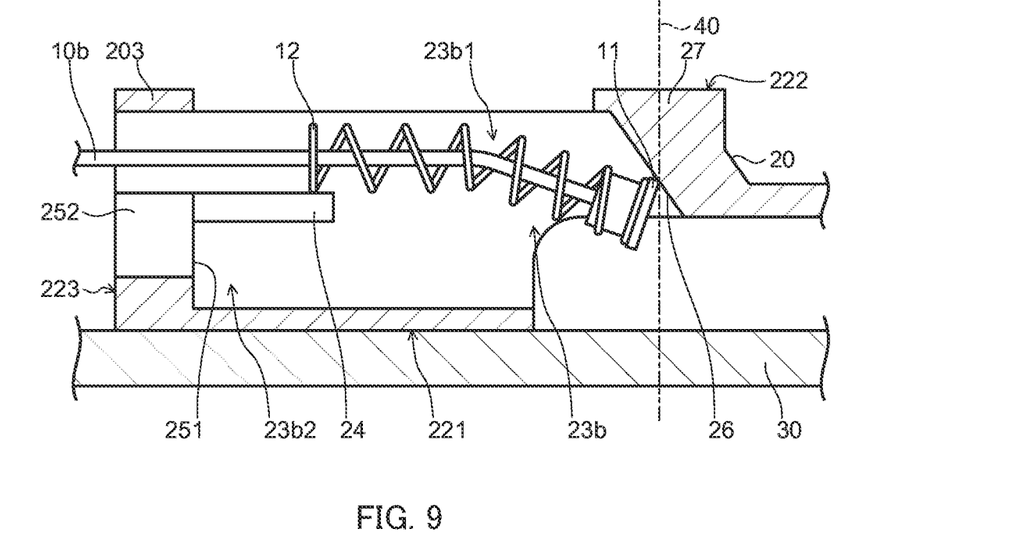
FIG. 9 is still another diagram for describing the process of inserting cable 10b into opening portion 23b of carrier plate 20.

FIGS. 7 to 11 are cross sectional views of carrier plate 20 obtained by cutting a plane, along A-A line shown in FIG. 1, including inclined portion 26, cable end 11 that is a metallic member fixed to one end of cable 10b, and spring 12. FIGS. 7 to 9 illustrate states in which cable end 11 is in contact with inclined portion 26.

First region 23b1 illustrated in drawings such as FIG. 7 is a space region through which the end portion of cable 10b inserted into opening portion 23b passes. First region 23b1 is a space region formed on the side of second surface 222 of carrier plate 20 from protrusion portion 24 in the region of opening portion 23b.

As illustrated in FIG. 8, inclined portion 26 inclines at a predetermined angle (e.g., 30° to 60°) with respect to virtual line 40 extending perpendicularly to the extending direction of guide rail 30, for example. Thus, when cable 10b is further pushed in while cable end 11 is in contact with inclined portion 26, cable end 11 is guided to second region 23b2 of opening portion 23b, sliding on the surface of inclined portion 26, as illustrated in FIG. 9.

Second region 23b2 is a space region for holding the end portion of cable 10b in opening portion 23b. Second region 23b2 is a partial region of opening portion 23b, and is a space region formed on the side of first surface 221 of carrier plate 20 from protrusion portion 24 in the region of opening portion 23b.

As described above, when cable end 11 slides on the surface of inclined portion 26, the rear end portion of spring 12 (the left end portion of spring 12) is in contact with protrusion portion 24, and thus is present in first region 23b1.

Figure 10:
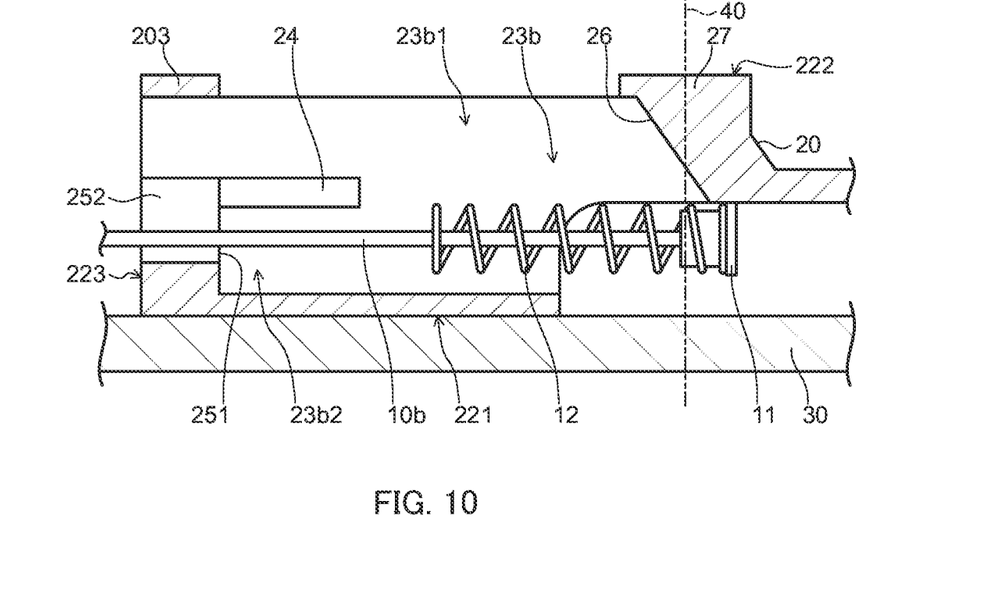
FIG. 10 is still another diagram for describing the process of inserting cable 10b into opening portion 23b of carrier plate 20.

When cable 10b is further pushed in, cable end 11 enters the space formed on the lower side of inclined portion 26 as illustrated in FIG. 10, and thus the rear end portion of spring 12 is also guided to second region 23b2.

Figure 11:
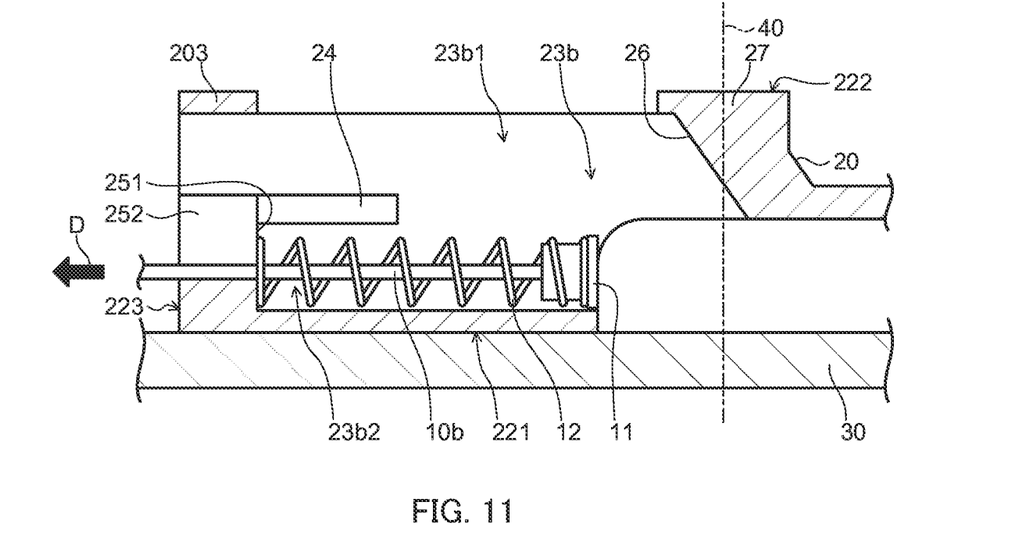
FIG. 11 is still another diagram for describing the process of inserting cable 10b into opening portion 23b of carrier plate 20.

Then, as illustrated in FIG. 11, cable 10b is pulled to the direction indicated by arrow D, and the end portion of spring 12 (the rear end portion of spring 12) comes into contact with contact surface 251 of holding portion 25. This restricts the movement of cable 10b in the direction of extension by contact surface 251 of holding portion 25.

Further, when the end portion of spring 12 is in contact with contact surface 251 of holding portion 25, protrusion portion 24 restricts the movement of the end portion of cable 10b to the side of first region 23b1. Therefore, it is possible to prevent the end of cable 10b from coming off opening portion 23b.

Figure 12:
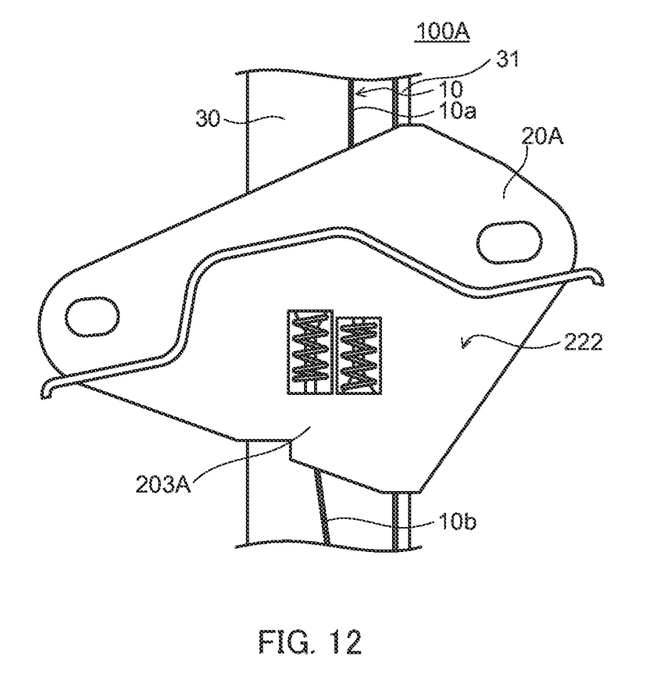
FIG. 12 illustrates an exemplary configuration of object movement device 100A, which is a comparative example of object movement device 100 according to the embodiment of the present invention.
Figure 13:
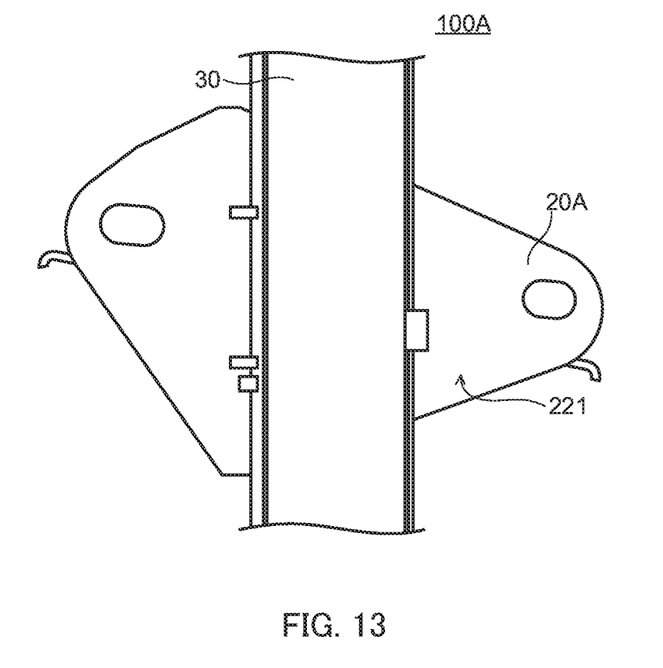
FIG. 13 is another diagram for describing the exemplary configuration of object movement device 100A, which is the comparative example of object movement device 100 according to the embodiment of the present invention.

FIG. 12 and FIG. 13 illustrate an exemplary configuration of object movement device 100A, which is a comparative example of object movement device 100 according to the embodiment of the present invention.

As illustrated in FIGS. 12 and 13, object movement device 100A according to the comparative example includes carrier plate 20A instead of carrier plate 20 illustrated in FIG. 1.

FIG. 12 illustrates a front side of guide rail 30 to which carrier plate 20A is attached, and FIG. 13 illustrates a back side of guide rail 30 to which carrier plate 20A is attached. The back side of guide rail 30 is a side facing the inner panel of the vehicle.

Figure 14:
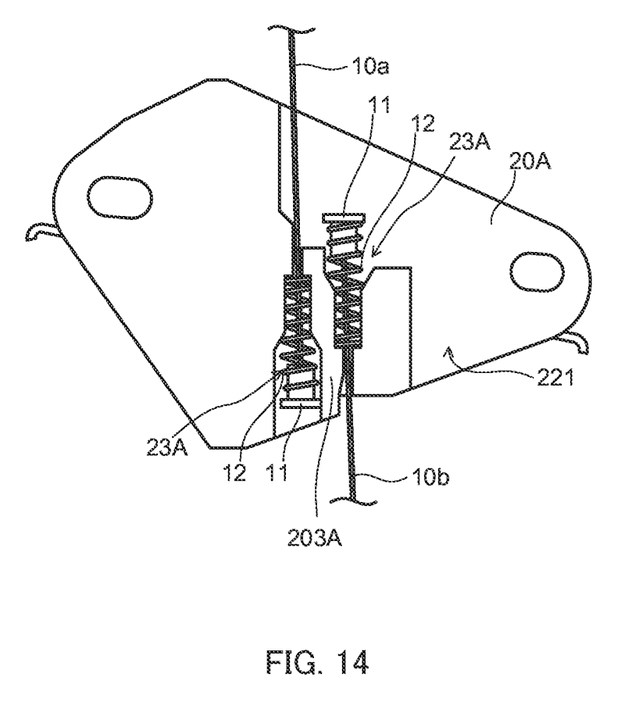
FIG. 14 illustrates an exemplary configuration of carrier plate 20A.

FIG. 14 illustrates an exemplary configuration of carrier plate 20A. As illustrated in FIG. 14, carrier plate 20A includes housing portion 203A instead of housing portion 203 illustrated in FIG. 1.

In housing portion 203A, recessed portion 23A for holding the end portion of cable 10 is formed instead of opening portion 23 illustrated in FIG. 1. Recessed portion 23A is formed on first surface 221 of carrier plate 20A, that is, on the surface facing the front surface of guide rail 30.

When object movement device 100A configured as described above is assembled, first, cable end 11 and spring 12 are placed in recessed portion 23A of carrier plate 20A before being attached to guide rail 30.

Thereafter, carrier plate 20A is attached to guide rail 30 while cable end 11 is kept from coming off carrier plate 20A.

As a result, as illustrated in FIG. 12, cable end 11 and spring 12 are placed between guide rail 30 and carrier plate 20A, and this prevents the end portion of cable 10 from coming off the gap between guide rail 30 and carrier plate 20A.

However, when carrier plate 20A according to the comparative example is used, as described above, carrier plate 20A needs to be attached to guide rail 30 while cable end 11 is kept from coming off carrier plate 20A. Therefore, there arises a problem in that work efficiency of assembling object movement device 100A is poor.

As a countermeasure against this, when recessed portion 23A is provided in second surface 222 of carrier plate 20A, the end portion of cable 10 can be fixed to carrier plate 20A while carrier plate 20A is attached to guide rail 30.

However, in such a configuration, a member for closing recessed portion 23A is required as a countermeasure for preventing the end portion of cable 10 from coming off recessed portion 23A, for example.

Further, in carrier plate 20A, providing a space region for forming recessed portion 23A on first surface 221 may decrease stiffness for holding a window glass in carrier plate 20A.

When a reinforcing member is provided to second surface 222 of carrier plate 20A to solve this problem, the thickness of carrier plate 20A increases, and thus the size of the carrier plate 20A may increase.

On the other hand, carrier plate 20 according to the embodiment of the present invention includes opening portion 23 that is provided between first surface 221 and second surface 222 of carrier plate 20 and into which cable 10 is inserted. This allows cable 10 to be fixed to carrier plate 20 only by insertion of the end portion of cable 10 into opening portion 23 while carrier plate 20 is attached to guide rail 30.

Further, because the wall surface of opening portion 23 around cable 10 serves as a reinforcement, a large-scale reinforcement is not required for second surface 222 of carrier plate 20; therefore, an increase in the size of carrier plate 20 can be suppressed. The wall surfaces of opening portion 23 around cable 10 serves as a reinforcement, and thus a decrease in stiffness for holding the window glass can be avoided. In addition, in a case where carrier plate 20 is placed to guide rail 30 curved in accordance with the shape of the curved window glass, carrier plate 20 can secure the sufficient strength even when the tensile stress by cable 10 is applied to carrier plate 20.

Further, as illustrated in FIG. 7, inclined portion 26 forms the space region (first region 23b1) through which the end portion of cable 10 inserted into opening portion 23 passes, and further includes rib portion 27 formed in second surface 222 of carrier plate 20 so as to bridge between wall surfaces 231 placed on both sides of cable 10.

As a result, insertion of cable 10 into opening portion 23 is not inhibited, and opening portion 23 can be reinforced without an increase of the size of carrier plate 20, so that the effect of enhancing the reliability of carrier plate 20 can be obtained in addition to the above-described effect.

Note that, for example, the following aspects are also understood to fall within the technical scope of the present disclosure.

(1) A carrier plate is a carrier plate to which a moving object is attached and that includes a holding portion holding an end portion of a driving-force transmission member transmitting a driving force for moving the moving object, and the carrier plate includes: a first surface facing a guide rail on which the carrier plate slides; a second surface placed on an opposite side of the first surface; and a side surface placed between the first surface and the second surface, the side surface including an opening portion into which the driving-force transmission member is inserted.

(2) The holding portion is provided at a position deeper toward the first surface than an insertion opening of the driving-force transmission member when viewed from the second surface, and the carrier plate further includes an inclined portion that guides, toward the first surface diagonally from a side of the second surface, the end portion of the driving-force transmission member inserted into the opening portion.

(3) The inclined portion forms a space region through which the end portion inserted into the opening portion passes, and the carrier plate further includes a rib portion formed in the second surface so as to bridge between wall surfaces placed on both sides of a space region into which the driving-force transmission member is inserted.

(4) An object movement device includes the carrier plate described above and moves the carrier plate with pulling of the driving-force transmission member to move the moving object.

It should be understood that the embodiment disclosed herein is illustrative and non-restrictive in all respects. It is intended that the scope of the invention be defined by the appended claims rather than the above description, and that all changes within the meaning and range of equivalency of the claims be included in the claims.

The embodiment of the present invention has been described above. It should be noted that the above description is illustrative of a preferred embodiment of the present invention, and the scope of the present invention is not limited thereto. That is, the configuration of the device and the shape of each part are merely an example, and it is obvious that various modifications and additions to these examples are possible within the scope of the present invention.

INDUSTRIAL APPLICABILITY

A carrier plate and an object movement device are useful as devices each capable of enhancing the efficiency of assembling operation while suppressing an increase in size.

REFERENCE SIGNS LIST

10 Cable
10a Cable
10b Cable
11 Cable end
12 Spring
20 Carrier plate
20A Carrier plate
23a Opening portion
23A Recessed portion
23b Opening portion
23b1 First region
23b2 Second region
24 Protrusion portion
25 Holding portion
26 Inclined portion
27 Rib portion
30 Guide rail
31 Guiding portion
40 Virtual line
100 Object movement device
100A Object movement device
201 Guided portion
202 Attachment portion
203 Housing portion
203A Housing portion
221 First surface
222 Second surface
223 Side surface
231 Wall surface
251 Contact surface
252 Pullout opening
D Arrow direction

The invention claimed is:

1. A carrier plate comprising:
a main body to which a moving object is attached and which is provided with a space region inside; and
a holder configured to hold, in the space region of the main body, an end portion of a driving-force transmission member transmitting a driving force for moving the moving object;
wherein the main body comprises:
a first surface facing a guide rail on which the carrier plate slides;
a second surface placed on an opposite side of the first surface; and
a side surface extending between the first surface and the second surface to face toward an outside to which the driving-force transmission member of which the end portion is held in the space region, the side surface including an opening portion provided spatially in communication with the space region, and
wherein the opening portion:
is a hole encircled by the side surface, and
has a shape in which a pullout opening and an insertion opening are continuous to each other, the pullout opening having a first width where the driving-force transmission member can pass but the end portion does not, the insertion opening having a second width which is wider than the first width and where the end portion can pass.

2. The carrier plate according to claim 1, wherein
the holder is provided at a deep position deeper toward the first surface than the insertion opening when viewed from the second surface, and
the carrier plate further includes an inclined portion that guides the end portion obliquely from a side of the second surface toward the deep position.

3. The carrier plate according to claim 2, wherein
the inclined portion forms the space region, and the carrier plate further includes a rib portion formed in the second surface so as to bridge between wall surfaces placed on both sides of the space region.

4. An object movement device comprising the carrier plate according to claim 1, wherein
the object movement device is configured to move the moving object attached to the carrier plate in accordance with movement of the carrier plate caused by pulling of the driving-force transmission member.

\* \* \* \* \*